W. J. WALKER.
Seed Separator.
No. 86,332.
Patented Jan. 26, 1869.
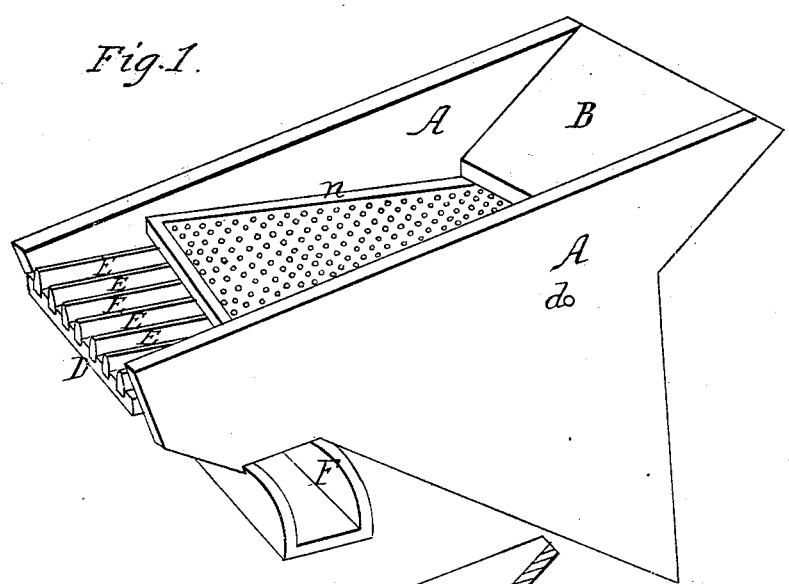
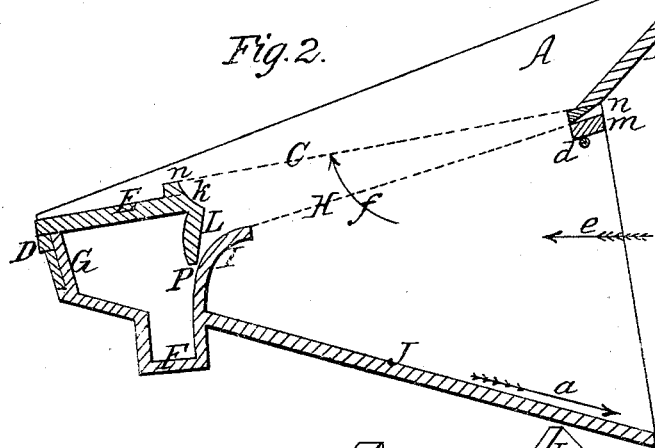
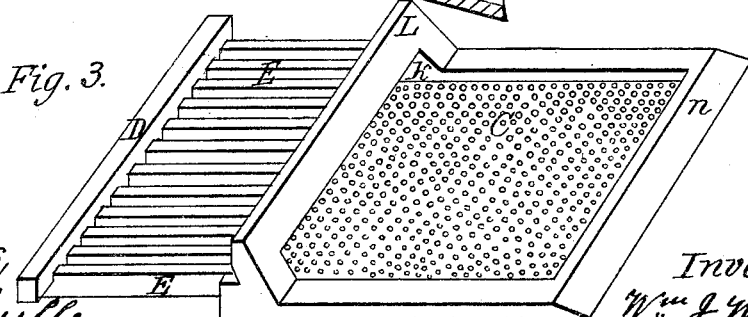
Witnesses,
John Little
Robert Telford
Inventor,
Wm. J. Walker
By his Attorney
G. L. Chapin

WILLIAM J. WALKER, OF DORSET, ILLINOIS.

Letters Patent No. 86,332, dated January 26, 1869.

IMPROVEMENT IN SEED-SEPARATOR.

The Schedule referred to in these Letters Patent and making part of the same.

*To all whom this may concern:*

Be it known that I, WILLIAM J. WALKER, of Dorset, in the county of De Kalb, and State of Illinois, have invented an Improved Seed-Separator; and I do hereby declare that the following is a full, clear, and exact description of the construction and operation of the same, reference being had to the accompanying drawings, and letters marked thereon, making a part of this specification, in which—

Figure 1 is a perspective representation of my invention, as applied to the shoe of an ordinary separator.

Figure 2, a longitudinal section of the same.

Figure 3, an inverted representation of the upper sieve and rack removed from the shoe.

This invention relates to an improvement in that class of separators which are designed to clean grass, clover, and flax-seed, as they are threshed by the machine; and Its nature consists in a novel construction of a rack and sieves, which are so arranged that the wind from the mill passes through the sieves, and permits the seed to pass out at the windward end of the shoe; and in fitting the heads of the sieves closely together, and applying a wind-break to the under side of the tail of the upper sieve, whereby the wind is prevented from blowing the seed through the throat of the sieves, and into the return-spout below.

To enable others to fully understand the construction and operation of my invention, I have marked corresponding parts with similar letters, and will now give a detailed description of the same.

A A, figs. 1 and 2, represent an ordinary wooden shoe, which is now generally used to support the sieves of grain-separators, and its construction and operation are so simple as to need no particular description.

C represents the upper sieve, which is made of ordinary perforated plate, and secured to a frame, $n$, in the usual manner.

The tail-end of the frame is fastened to a rack, E, which is made of wooden slats, or strips, placed such distances apart as will allow unthreshed heads of seed to pass between them, and fall into a return-trough, F, and be carried to the thresher in the usual manner, the tail-end of the rack being secured to a cross-piece, D, which shuts over the tail-board G of the shoe A, is held firmly in position, and also supports the tail-end of the sieve C.

L represents what I term a wind-break, permanently attached to the under side of the tail-end of the sieve C, and projects downward, and forms a throat, P, between it and the tail I of the sieve H, as clearly shown at fig. 2, and it has a recess, K, to catch the wind, and prevent it from passing down the throat, and carrying seed with it into the trough F.

The lower sieve, H, is made with suitable meshes, for seed to pass through, and its tail-end, I, is curved downward, and fits closely on the bottom chute, J, of the shoe A, as shown at fig. 2, and it, as thus constructed, turns the wind upward and through the sieve H C, and permits dust to pass out at the throat P, and the seed to fall on the chute J, and pass out to the windward of the shoe, as indicated by the dart $a$.

The heads of the sieves at $n'$ $m$ are placed closely together, as shown at fig. 2. The upper sieve bearing against the under edge of the chaff-chute B, and the lower sieve resting on pins $d$, put through the sides of the shoe A, are held in place, and prevent the wind from having a sweep parallel with their upper surfaces.

The seed and chaff fall on the sieve C, and the wind enters the shoe in the direction indicated by the dart $e$, and its direction through the sieves is shown by the darts $f$.

If the seed is very dirty, the sieve H can be so drawn back from the break L, as to increase the size of the throat P, and thus allow dust to freely pass into the trough F.

At fig. 2, the sieves are represented as in position for cleaning clover and grass-seed, but when flax-seed is to be cleaned, the sieve H should be removed.

It will be seen by this description, that my invention is based wholly on the arrangement of the sieves, and the means shown for preventing the wind from passing out at the throat P, and through the rack E.

Having thus fully described my invention,

What I claim, and desire to secure by Letters Patent of the United States, is—

1. The sieve C, arranged with a wind-break, L, recess K, and rack E, substantially as set forth and described.

2. The combination of the sieve C, break L, recess K, rack E, and sieve H, the latter having a curved tail-board I, and the whole being arranged to operate in the shoe A, as and for the purpose set forth.

WM. J. WALKER.

Witnesses:
JOHN FULLE,
ROBERT TELFORD.